(12) United States Patent
Drepper

(10) Patent No.: US 6,651,025 B1
(45) Date of Patent: Nov. 18, 2003

(54) METHOD AND DEVICE FOR DETERMINING A REGULARITY

(76) Inventor: Friedhelm R. Drepper, Gruener Weg 91, D-52349 Dueren (DE)

( * ) Notice: Subject to any disclaimer, the term of this patent is extended or adjusted under 35 U.S.C. 154(b) by 0 days.

(21) Appl. No.: 09/889,456

(22) Filed: Mar. 28, 2002

(30) Foreign Application Priority Data

Nov. 21, 1998 (DE) .......................................... 198 53 765

(51) Int. Cl.$^7$ ................................................. B25J 9/16
(52) U.S. Cl. ....................... 702/127; 700/263; 701/100; 318/568.1
(58) Field of Search ....................... 700/263; 318/568.1, 318/568.11; 701/100, 103; 702/127

(56) References Cited

U.S. PATENT DOCUMENTS 5,159,249 A    10/1992    Megherbi ................ 318/518.1

FOREIGN PATENT DOCUMENTS

| EP | 0 338 705 A2 | 10/1989 |
| WO | WO 95/23054 | 8/1995 |

OTHER PUBLICATIONS

K. Tchon, (Short Paper) "A Normal Form of Singular Kinematics of Robot Manipulators with Smallest Degeneracy"; 8259 IEEE Transactions on Robotics and Automation, vol. 11, No. 3, (1995) NEw York, US, pp. 401–408.

K. Tchon, XP–000784570, "A normal form solution to the singular inverse kinematic problem for robotic manipulators: the quadratic case"; Proceedings of the (1998) (IEEE) International Conference on Robotics & Automation, Belgium, pp. 3222–3227.

D.N. Nenchev, XP–000775136, Two Approaches to Singularity–Consistent Motion of Nonredundant Robotic Mechanisms,; Proceedings of the (1996) International Conference on Robotics & Automation, Minnesota, pp. 1883–1890.

*Primary Examiner*—Kamini Shah
(74) *Attorney, Agent, or Firm*—Schiff Hardin & Waite

(57) ABSTRACT

The invention relates to a device or method to determine the phenomenological regularity of the phase modulation of one or more cyclically fluctuating quantities, including the possibility to determine a regularity induced by mutual interaction. According to the invention, the regularity is determined as an autoregressive model of successive phase angles which are each defined as homogenous function of a low number of successive values of each of the cyclically fluctuating quantities. The periodicity of all functions of such phase angles permits an efficient approximation of the regularity by finite Fourier series. A skilled choice of the homogenous function (canonical phase) as well as of a related implicit estimation scheme guarantees that a good approximation of the angle dynamics results also in good reconstructions of the original dynamics. The estimated Fourier approximated Invertibility supporting Phase-Space maps (FIPS maps) can be used for prediction and/or control as well as for the identification and characterization of phase synchronized technical or scientific processes. The characterization of the mutual cross impact includes a distinction of the direction of the interaction.

13 Claims, 3 Drawing Sheets

METHOD AND DEVICE FOR DETERMINING A REGULARITY

BACKGROUND OF THE INVENTION

1. Field of the Invention

The invention relates to a method to detect and/or determine the regularity of a cyclically fluctuating scientific or technical quantity as well as to a device to perform the method.

2. Description of the Related Art

A fluctuating quantity is a quantity which oscillates as function of time. A cycle is the time span between three successive crossings of the average of a scientific or technical quality (technical QUANTITY-A). A crossing of the average is a point in time when the technical QUANTITY-A equals the average of technical QUANTITY-A.

The regularity of behavior of technical QUANTITY-A may include an impact from other cyclically fluctuating scientific or technical quantities. Examples of cyclically fluctuating scientific or technical quantities are the amount of fuel injected into a combustion engine, the resulting torque or respiratory activity and heartbeat length of humans.

The detection and determination of behavioral regularity is related to phenomenological reconstruction methods of multivariate processes. This is often achieved by using linear approaches ("Box G. E. and G. M. Jenkins, Time series analysis: forecasting and control, Holden-Day, Oakland, Calif., 1976"). In addition to this, nonlinear approaches have been chosen which approximate the behavioral regularity, e.g., by polynomials or by so called radial basis functions ("Casdagli M., Nonlinear prediction of chaotic time series, Physica D 35, 335, 1989" and "Broomhead D. and Lowe D., Multivariable functional interpolation and adaptive networks, Complex Syst. 2, 321, 1988").

In the case of a regularity involving several quantities, synchronous or temporarily synchronous behavior is of special interest. The notion of synchronization, which was originally limited to periodically oscillating quantities, has recently been generalized to aperiodically fluctuating quantities. Phase synchronization (Rosenblum M. G., A. S. Pikovsky und J. Kurths, Phase Synchronization of chaotic oscillators, Phys. Rev. Lett. 76, 1804, 1996) is a bivariate regularity, which can even be determined in the case of fluctuating quantities with instationary amplitudes.

The analysis of phase synchronization is often based on the so-called Hilbert phase (Rosenblum et al., 1996). In general a regularity expressed in terms of Hilbert phases cannot be transformed to a regularity expressed in terms of the fluctuating original quantities. One reason for this is the fact that, without special precautions, a reconstructed trajectory in the phase or angle space may pass the immediate neighborhood of a singularity of the functional determinant of the back-transformation to the original (Cartesian) coordinates.

When developing tools to analyze coupled, aperiodic and instationary quantities, cardio-respiratory interaction plays the role of a pilot study. As expressed in "Hirsch J. A, and B. Bishop, Respiratory sinus arrhythmia in humans: how breathing pattern modulates heart rate, Am. J. Physiol. 241: H620–H629, 1981", respiratory activity and heartbeat length fluctuate in "synchrony". In addition "Pessenhofer H. und T. Kenner, Zur Methodik der kontinuierlichen Bestimmung der Phasenbeziehung zwischen Herzschlag und Atmung, Plügers Arch. 355, 77:83, 1975" describe a so called phase locking phenomena which result from the fact that heartbeats have the tendency to occur preferentially during certain phases of the respiratory cycle.

Both forms of cardio-respiratory interaction are seen as an indicator of a healthy enervation of the heart. Absence of synchronization in a state of physical and psychological relaxation may be interpreted either as a symptom of an autonomous neuropathy (e.g., Diabetes mellitus) or as an increased risk of heart attack.

German patent application 197 18 806.0 to describes a device and method to determine the regularity of the heartbeat rate. The device shows a pacemaker to trigger the respiratory activity as well as a detector to measure the heartbeat rate. The device determines a behavioral regularity of the heartbeat lengths of a healthy human in relaxed state. A measure of the regularity is a two-dimensional pattern, which is determined as follows.

During voluntary paced respiration, the ECG of a subject is recorded and the heartbeat lengths are extracted. A high pass filter is applied, which eliminates frequencies lower than the breathing frequency. The sequence of heartbeat lengths is converted to a two-dimensional graph showing the length of a heartbeat as function of the preceding heartbeat length. A typical graph will result in an ellipse type pattern.

The coordinates of this graph are transformed to polar coordinates (angles and radii) using the average heartbeat length as the center. This way, a certain number of heartbeat lengths are converted to a set of angles, which may be interpreted as an alternative to the Hilbert phase (and whose number is reduced by one).

The sequence of angles is also converted to a two-dimensional graph representing the these angles as function of their preceding angle.

For young subjects and slow pacing in particular, this graph results in a pattern similar to a two step staircase. In these cases, a deviation from the typical pattern may be taken as a symptom for physical or autonomic abnormality or change. Further studies have given evidence that this method is less useful for older humans. In particular, this method relies on voluntary pacing, which takes some time to perform in a relaxed state. Thus the method cannot be applied without difficulties.

The three publications, U.S. Pat. No. 5,159,249, European Patent EP 0 338 705 A and TCHON K. et al. "A normal form solution to the singular inverse kinematic problem for . . . , proceedings of the IEEE International Conference on Robotics and Automation, U.S., New York, N.Y.: IEEE, Bd CONF. 15. 1998, pages 3222–3227" offer three solutions to avoid singularities of the transformation from Cartesian coordinates to angle coordinates. However, the three solutions are not suited to set up a general time series model, which guarantees the avoidance of these singularities by construction. In particular, they do not provide any clues for finding appropriate alternative angle- or phase definitions.

SUMMARY OF THE INVENTION

The aim of the invention is the creation of a universal and simple method to detect and determine the regularity of the phase modulation of a cyclically fluctuating quantity including the possibility to determine the regularity induced by cross impact from other cyclically fluctuating quantities as well as the guarantee that the back-transformation of reconstructed phase modulation does not lead to singular reconstructions of the cyclically fluctuating quantity. A further aim of the invention is the deployment of a device to perform the method.

The aim is achieved by the method and device described below.

DETAILED DESCRIPTION OF THE PREFERRED EMBODIMENTS

Figure 1:
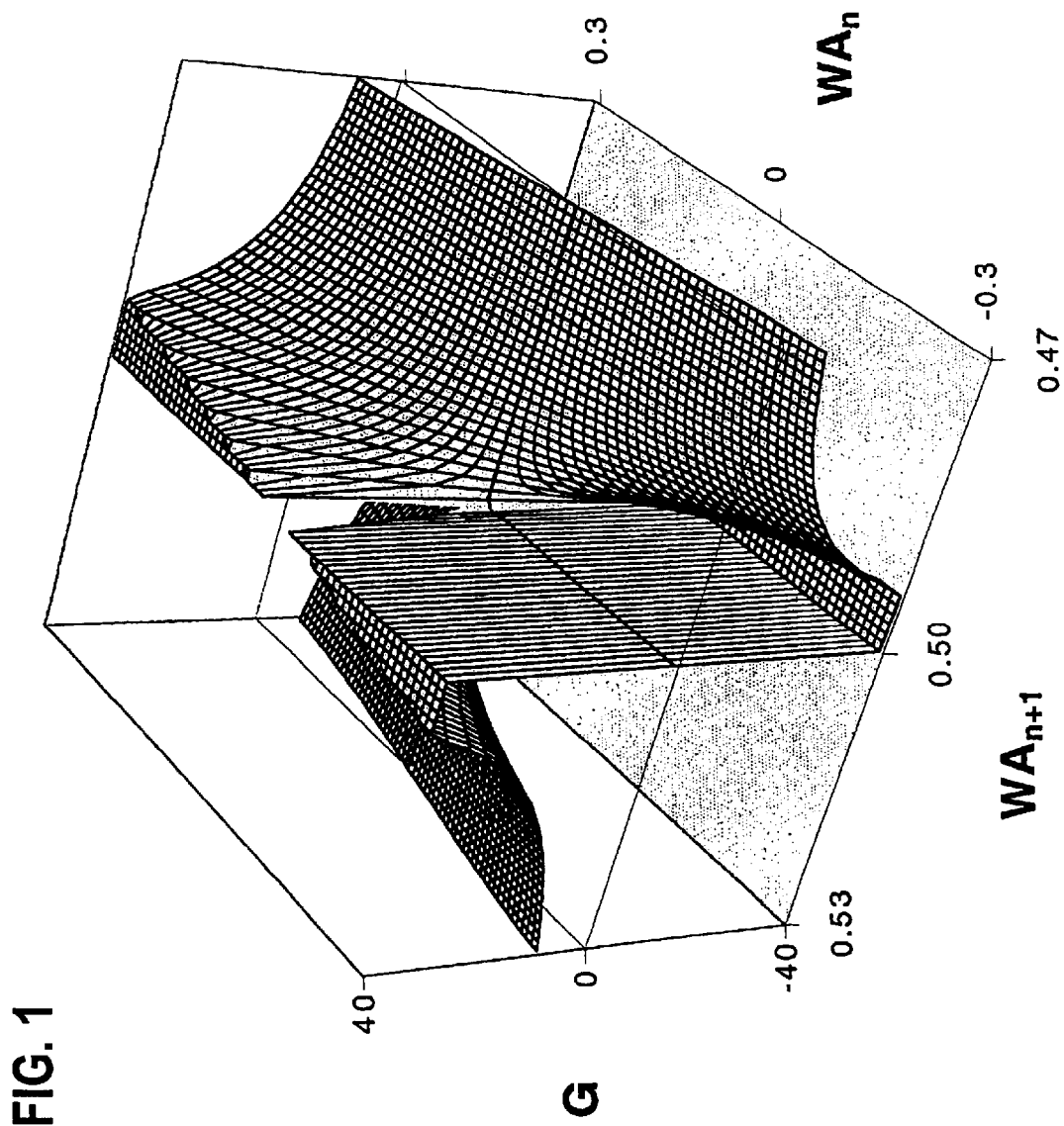
FIG. 1 is a three-dimensional plot showing the proximity of a central singularity of the function $G(WA_{n+1}, WA_n)$ in Example 2.

According to the inventive method, values $A_i$ of QUANTITY-A are determined (e.g., consecutive in time), in particular, more than two values $A_i$, $A_{i+1}$, ... of QUANTITY-A per average cycle. Variable indices i, n, ... are used to number the determined values in consecutive order. [E.g. with i=2 $A_{i+1}$, results as $A_3$.]

Using a homogenous function $W(A_i, A_{i+1}, \ldots)$, at least two determined values $A_i$, $A_{i+1}$, ... are mapped to a value of type angle (WINKEL). The values of type QUANTITY-A may not be direct successors. The homogenous function $W(A_i, A_{i+1}, \ldots)$ obeys the equation $W(a_{positive}*A_i, a_{positive}*A_{i+1}, \ldots) = W(A_i, A_{i+1}, \ldots)$ for every $a_{positive}$, where $a_{positive}$ can be any positive number.

The mapping is described by (A→W). A is a set of QUANTITY-A. W is a value of type angle (WINKEL). The definition set of (A→W) contains as many elements of A as are necessary to form a value of type angle. When a definition set of (A→W) assumes the value zero, the corresponding angle is no longer defined.

Using homogenous function $W(A_i, A_{i+1}, \ldots)$, at least two determined values $A_i$, $A_{i+1}$, ... are mapped to a value of type angle, which will be called WINKEL1 in the following.

Using homogenous function $W(A_i, A_{i+1}, \ldots)$, at least two determined values $A_{i+k}$, $A_{2+k}$, ... are mapped to a value WINKEL2 (A→W). As a preferred embodiment, at least two determined values $A_{1+m}$, $A_{2+m}$, ... are mapped to a value WINKEL3 (A→W). k, m are natural numbers. k has to be greater than or equal to 1. Furthermore m should be greater than k. A preferred embodiment is m=2k. To achieve good results, k should be chosen comparatively small, in particular, smaller than the largest index in the definition set of WINKEL1.

This way successive angles evidence overlapping definition sets. Due to the overlap, successive values of type angle cannot be transformed back independently. In particular, it may happen that a sequence of angles WINKEL(n), WINKEL(n+1), ... contains forbidden combinations for which the back-transformation of $W(A_i, A_{i+1}, \ldots) = WINKEL(n)$, $W(A_{i+k}, A_{i+k+1}, \ldots) = WINKEL(n+1)$,

...

may either not be possible or possesses exclusively solutions A which contain either at least one complete zero-valued definition set and/or at least one singular element. All other combinations in a sequence of angles are allowed combinations of angles (WINKEL). An element of A becomes singular when the modulus of this element goes to infinity (diverges).

According to the invention, the natural number $k \geq 1$ and the homogenous function $W(A_i, A_{i+1}, \ldots)$ are chosen in such a way that the back-transformation of a sequence of values of type angle will evidence forbidden combinations of two angles, where a combination of WINKEL(n) and WINKEL(n+1) is forbidden, when the back-transformation of $W(A_i, A_{i+1}, \ldots) = WINKEL(n)$ and $W(A_{i+k}, A_{i+k+1}, \ldots) = WINKEL(n+1)$ allows exclusively solutions A, in which either at least one complete definition set of (A→W) assumes the value zero and/or at least one element of A becomes singular.

Furthermore, homogenous function $W(A_i, A_{i+1}, \ldots)$ is chosen in such a way that the back-transformation of successive values of type angle evidences at least one central allowed combination of angles which lies in the intersection of manifolds (e.g., lines), which are formed by forbidden combinations of angles. In particular, a central allowed combination of angles evidences a neighborhood of combinations of angles as small as desired which contains, besides allowed combinations of angles, also two different types of forbidden combinations of angles. The difference of the two types of forbidden combinations of angles is related, e.g., to different sites of the zero valued definition set within A.

According to the invention, the following equation is set up (implicit rule of behavior)

$G[WINKEL(n+1), WINKEL(n), \ldots] = F[WINKEL(n), \ldots; p1, \ldots]$.

The function $F[WINKEL(n), \ldots; p1, \ldots]$ may depend on one or several arguments of type angle and is preferentially chosen in such a way that F will not evidence a singularity for finite values of parameters p1, p2, ....

The function $G[WINKEL(n+1), WINKEL(n), \ldots]$ has at least two arguments and is chosen in such a way that G evidences singularities for combinations of WINKEL(n+1) and WINKEL(n) which belong to the set of forbidden combinations of two angles, or function G is chosen in such a way that G can be represented as a bounded (preferentially non-descending monotonous) univariate function of such a singular, multivariate function. A function $y(x1, x2, \ldots)$ evidences a singularity if there exists a combination of x1, x2, ..., where the modulus of y goes to infinity.

The function $G[WINKEL(n+1), WINKEL(n), \ldots]$ is also chosen in such a way that G evidences at least one central singularity for which there exists a convex neighborhood (as small as desired) of combinations of angles, within which function G assumes any value and which lies at a site which evidences the property of a central allowed combination of angles. (The neighborhood of a central singularity can be visualized as two 180° spiral staircases with infinitely small steps which become increasingly steeper at the two ends). At the site of a central singularity, function G degenerates to a set valued function. If multivariate function G is chosen as a bounded univariate function of a singular, multivariate function of the kind as described, the degeneracy extends to a set of function values within a finite interval.

The parameters p1, p2, ... of function $F[WINKEL(n), \ldots; p1, \ldots]$ are determined by adjusting the implicit rule of behavior to the values WINKEL1, WINKEL2, .... The adjustment of function F is achieved either by a type of interpolation or approximation or with the help of different regression methods to adjust its parameters. Starting from the residuals $R(n) = G[WINKEL(n+1), WINKEL(n), \ldots] - F[WINKEL(n), \ldots; p1, \ldots]$ of the implicit rule of behavior with WINKEL(1)=WINKEL1, WINKEL(2)=WINKEL2, ..., in the case of interpolation, the equation system is solved, which results from setting all residuals to zero. In the case of approximation, a well-known embodiment is to minimize the sum of squares of the residuals (least squares approximation). Other regression methods may, e.g., maximize a likelihood function based on the assumption that the residuals are independent random numbers. In both numerical examples, the random numbers are additionally assumed to be Gaussian distributed and function F[WINKEL(n), . . . ; p1, . . . ] to be linearly dependent on the parameters p1, p2, . . . . In this case, the adjustment of the parameters can be done most easily by minimizing the sum of squares, i.e., by performing well-known linear regression. G[WINKEL (n+1), WINKEL(n), . . . ])=F[WINKEL(n), . . . ; p1, . . . ] is used to express the regularity.

Since the regularity has been derived from a scientific or technical quantity, the regularity itself has as well to be seen as a scientific or technical quantity. The regularity of a cyclically fluctuating technical quantity may e.g., be used to control a technical process (like the injection of fuel into an engine) to achieve a given normal or desirable state or behavior.

Furthermore, there are technical or scientific processes, like the beating of the heart, for which deviations of the regularity in the normal state can be used to detect perturbations or abnormalities of the technical/scientific process. A diagnosis is possible if and only if the detected deviation is typical for one or several types of abnormalities. To diagnose abnormality 1, e.g., one must infer how the regularity in the case of abnormality 1 deviates from the normal state. The result is taken as reference pattern 1. Future deviations from the normal state are then compared with reference pattern 1. If these deviations do match reference pattern 1 sufficiently close, this is at least an indication of the presence of abnormality 1.

Scientific/technical QUANTITY-A is obtained from a fluctuating measurement signal, which is typically sampled successively in time. In general, this measurement signal will contain perturbing components. Perturbing components are, e.g., high frequency noise, slow drift due to temperature changes or low frequency fluctuations of physiological processes in organisms. QUANTITY-A is determined in particular by freeing the measurements from perturbing components. This can be done in particular by applying a high- and/or low pass filter. The average of the resulting cyclically fluctuating QUANTITY-A may assume a value, which is different from zero, however preferentially the value zero.

In a preferred embodiment of the claimed method, the implicit rule of behavior

G[WINKEL(n+1), WINKEL(n), . . . ]=F[WINKEL(n), . . . ; p1, . . . ] is solved for WINKEL(n+1)=H(WINKEL(n), . . . ; p1, . . . )

and the solved equation is taken as expression of the regularity. This way the implicit representation of the regularity is transformed to an explicit representation. The explicit form is better suited to achieve reconstructions or controls of technical/scientific processes.

In an embodiment of the claimed method, all functions of angles, in particular the functions G[WINKEL(n+1), WINKEL(n), . . . ] and F[WINKEL(n), . . . ; p1, . . . ], are chosen in such a way that they evidence a period for every argument of type angle, WINKEL(n+1), WINKEL(n), . . . . When the range of an angle is finite, period P equals the difference between the largest and the smallest angle. When the range of angles is unbounded, there exists a minimal period length P. All integer multiples of P are periods as well. In this case, a general angle W can be transformed to a reduced angle W' (within a reduced range of extension P) for which all mentioned functions assume the same value as for W. W' can be obtained with the help of the modulo (rest) function, e.g., as W'=mod(W, P). Thus it can be assumed without loss of generality that the range of any angle W is finite. When a function f has a period, the following relation is valid:

f(largest angle)=f(smallest angle).

In an embodiment of the claimed method, $W(A_i, A_{i+1}, \ldots)$=arctan $2(L_1, L_2)$ is chosen as homogenous function, where $L_1$ and $L_2$ are linear combinations according to $L_1=(c_1A_i+c_2A_{i+1}+ \ldots)$ and $L_2=(d_1A_i+d_2A_{i+1}+ \ldots)$.

For a suitable choice of the constants $c_1, c_2, \ldots$, and $d_1, d_2, \ldots$ (see examples) this specification leads to examples of suitable homogenous functions. Bivariate function arctan 2 is defined as:

arctan 2(x, y)=arctan(x/y) for $x \geq 0$, arctan 2(x, y)=$\pi$+arctan(x/y) for x<0.

In a further embodiment of the claimed method, function

G[WINKEL(n+1), WINKEL(n)]=[tan(WINKEL(n+1)+ $\partial$)+b]*y(WINKEL(n))

is used. This embodiment of function G supports the requirement that the necessary singularities are at appropriate places. Furthermore, function H can explicitly be given. For a suitable choice of constants $\partial$ and b as well as of univariate function y this specification leads to examples of a suitable function G.

In a further embodiment of the claimed method

F[WINKEL(n), . . . ; p1, . . . ]=$p_0$+$\Sigma\{p_i$*sin(f*i*WINKEL(n))+$pp_i$*cos(f*i*WINKEL(n))\} is chosen with f=$2\pi$/ (length of range of W).

$\Sigma$ stands for the sum from i=1 to m. If the range of angles is unbounded, the reduced range of angles should be taken.

In a further embodiment of the claimed method

F[WINKEL(n), . . . ; p1, . . . ]=$\Sigma\{pa_i$*sin[f*i*WINKEL(n)+$\alpha_i$]\}+$\Sigma\{pb_j$*sin[f*j*WINKEL(n-1)+$\beta_j$]\}+ $\Sigma\{pc_k$*sin<f*k*[WINKEL(n)-WINKEL(n-1)+$\chi_k$]>\}+ $\Sigma\{pd_m$*sin<f*m*[WINKEL(n)+WINKEL(n-1)+$\delta_m$]>\}+ . . . , is chosen, where i=0, . . . , $m_a$, j=0, . . . , $m_b$, k=0, . . . , $m_c$, m=0, . . . , $m_d$ as well as f>0.

$\Sigma$ represents a sum. The corresponding running indices are denoted in sequence as i, j, k or m.

In an embodiment of the claimed method, additional steps are performed for at least one additional scientific/technical QUANTITY-B. The homogenous function applied to QUANTITY-B must not necessarily be identical to the previously mentioned one. The same applies to the range of angles defined by this homogenous function. Finally, G[$WINKEL_A$(n+1), $WINKEL_A$(n), . . . ]=F[$WINKEL_A$(n), $WINKEL_B$(n), . . . ; p1, . . . ] is used to express the regularity of QUANTITY-A including the effect of cross impact from QUANTITY-B. The new function F has been extended by the argument corresponding to QUANTITY-B. For distinction, the values of type angle are marked either by A or by B. $WINKEL_A$(n) corresponds to QUANTITY-A and has so far been denoted as WINKEL(n). $WINKEL_B$(n) corresponds to QUANTITY-B.

The extension does not only open the possibility to express the regularity of a single scientific or technical quantity, but also the regularity of several scientific or technical quantities including their mutual interaction or correlation. One advantage of the method is the fact that qualitative and quantitative properties of the phase synchronization can directly be obtained from the adjusted (estimated) rule of behavior or from resulting reconstructions of phase angles. In particular, the qualitative properties may relate to the direction of mutual interaction.

Since according to the invention the mutual interaction can be inferred quantitatively, the previously mentioned embodiment opens the possibility to predict one of the quantities by observing the other quantity, which may, e.g., be correlated or phase synchronized to the first one. QUANTITY-B may, e.g., describe the respiratory activity of a human and QUANTITY-A his/her heartbeat. In a further example, QUANTITY-B can be the amount of fuel injected into an engine and QUANTITY-A its torque.

In a further embodiment of the method

G[WINKEL$_A$(n+1), WINKEL$_A$(n), . . . ]=p$_0$+Σ{pa$_i$*sin[f*i*WINKEL$_A$(n)+α$_i$]}+Σ{pb$_j$*sin[f*j*WINKEL$_B$(n)+β$_j$]}+Σ{pc$_k$*sin<f*k*[WINKEL$_A$(n)−WINKEL$_B$(n)+χ$_k$]>}+Σ{pd$_m$*sin<f*m*[WINKEL$_A$(n)+WINKEL$_B$(n)+δ$_m$]>}+ . . . , where i=0, . . . , m$_a$, j=0, . . . , m$_b$, k=0, m$_c$ and f>0, is taken to express the regularity. The regularity may include a cross impact by QUANTITY-B.

If a function is given with a single argument, e.g., f(x), other functions may be appropriate as well, which depend on further arguments like f(x, y).

A device to perform the method includes a detector (measurement device) to determine values A$_i$ of QUANTITY-A. A computer is connected with the detector in such a way that the determined values are automatically stored into the computer. The computer may run an installed program, which implements the steps of the method. At least one of the regularities and a correlation may be graphically represented via a display or a printer.

The computational steps implement a method to detect and determine the phenomenological regularity of the phase modulation of one or more cyclically fluctuating scientific or technical quantities, including the possibility to determine a regularity induced by mutual interaction. According to the invention, the regularity is determined as an autoregressive model of successive phase angles which are each defined as homogenous function of a low number of successive values of each of the cyclically fluctuating quantities. The periodicity of all functions of such phase angles permits an efficient approximation of the regularity by finite Fourier series. A skilled choice of the homogenous function as well as of a related implicit estimation scheme guarantees that a good approximation of the angular dynamics results also in good reconstructions of the original dynamics. The estimated regularity can be used for prediction and/or control as well as for the identification and characterization of several phase synchronized processes. The characterization of the mutual cross impact includes a distinction of the direction of the interaction.

In the following, the invention is further explained, based on two numeric examples.

EXAMPLE 1

The first example reconstructs a strongly asymmetric harmonic function based on a time series, which has been generated by formula A$_t$=4/9 SIN(2PI*t/Tau)*(3−SIN(2PI*t/Tau)) with t=0, 1, 2, . . . , 17 and which is given as QUANTITY-A in Table 1. The (incommensurate) period length Tau has been chosen as 7.777777.

TABLE 1

| t | QUANTITY-A | Angle WA | Reconstructed angle W_r | Reconstructed QUANTITY-A | Better Reconstructed W_r | Better reconstructed QUANTY-A |
|---|---|---|---|---|---|---|
| 0 | 0.0000 | −0.5795 | −0.5795 |  | −0.5795 |  |
| 1 | 0.7315 | 0.0253 | 0.0131 | 0.7315 | 0.0233 | 0.7315 |
| 2 | 0.8884 | 0.6872 | 0.7186 | 0.8914 | 0.6876 | 0.8887 |
| 3 | 0.6849 | 1.8185 | 1.8369 | 0.7149 | 1.8203 | 0.6888 |
| 4 | −0.1231 | 2.5809 | 2.5825 | −0.1847 | 2.5819 | −0.1260 |
| 5 | −1.3141 | −3.0289 | −3.0151 | −1.3012 | −3.0301 | −1.3260 |
| 6 | −1.7577 | −2.3527 | −2.3163 | −1.8730 | −2.3540 | −1.7719 |
| 7 | −0.9373 | −1.4671 | −1.4252 | −0.8620 | −1.4673 | −0.9502 |
| 8 | 0.2239 | −0.3960 | −0.3807 | 0.2334 | −0.3987 | 0.2263 |
| 9 | 0.8032 | 0.1302 | 0.1714 | 0.8223 | 0.1226 | 0.8154 |
| 10 | 0.8775 | 0.9321 | 1.0222 | 0.8752 | 0.9087 | 0.8962 |
| 11 | 0.5669 | 2.0161 | 2.0779 | 0.5198 | 1.9992 | 0.5882 |
| 12 | −0.3862 | 2.7300 | 2.7702 | −0.4800 | 2.7179 | −0.3670 |
| 13 | −1.5188 | −2.8791 | −2.8141 | −1.5975 | −2.8922 | −1.5294 |
| 14 | −1.6701 | −2.1916 | −2.1132 | −1.6881 | −2.2091 | −1.7028 |
| 15 | −0.6622 | −1.2010 | −1.0777 | −0.5147 | −1.2290 | −0.7009 |
| 16 | 0.4136 |  |  | 0.4676 |  | 0.4011 |
| 17 | 0.8502 |  |  | 0.8450 |  | 0.8614 |

W(A$_1$, A$_2$, A$_3$)=arctan 2(A$_1$+2A$_2$+A$_3$, sqrt(3)A$_1$−sqrt(3)A$_3$) is chosen as homogenous function, with the linear combinations L$_1$(A$_1$, A$_2$, A$_3$)=A$_1$+2A$_2$+A$_3$ and L$_2$(A$_1$, A$_2$, A$_3$)=sqrt(3)A$_1$−sqrt(3)A$_3$, where sqrt indicates the square root.

As result of the map (A→W), the following angle (WINKEL) type values WA are determined:

WA$_1$=W(A$_1$, A$_2$, A$_3$)=arctan 2(A$_1$+2A$_2$+A$_3$, sqrt(3)A$_1$−sqrt(3)A$_3$), 3WA$_2$=W(A$_2$, A$_3$, A$_4$)=arctan 2(A$_2$+2A$_3$+A$_4$, sqrt(3)A$_2$−sqrt(3)A$_4$), . . .

The numerical values of all angles are given as column WA in Table 1. When choosing function G, the solvability of the back-transformation of (A→W) plays a special role. As an intermediate step of the back-transformation, (A→W) can be brought into the following implicit form, $$L_1(A_n, A_{n+1}, A_{n+2}) = R_n * \cos(WA_n) \quad (1a)$$

$$L_2(A_n, A_{n+1}, A_{n+2}) = R_n * \sin(WA_n) \quad (1b)$$

for n=1, 2, . . . , 15 and with the radii given as

R$_n$=sqrt(L$_1^2$(A$_n$, A$_{n+1}$, A$_{n+2}$)+L$_2^2$(A$_n$, A$_{n+1}$, A$_{n+2}$).

By eliminating A$_n$ from the couple of equations for WA$_n$ and A$_{n+3}$ from the corresponding couple for WA$_{n+1}$, the following solvability constraints are obtained, R$_n$*[sqrt(3)cos(WA$_n$)−sin(WA$_n$)]=R$_{n+1}$*[sqrt(3)cos(WA$_{n+1}$)+sin(WA$_{n+1}$)], which can also be written as $$R_n * \sin(WA_n + 2\pi/3) = R_{n+1} * \cos(WA_{n+1} - \pi/6). \quad (2)$$

Since the radii R$_n$ cannot become negative, the harmonic functions on both sides of the last equation have to change their signs simultaneously, i.e., they must also vanish simultaneously. If only one harmonic function vanishes, a forbidden combination of angles is obtained, for which equation system (1a) and (1b) cannot be solved for A$_1$, A$_2$, . . . , A$_{17}$. The forbidden combinations lie on two lines, whose intersection represents a central allowed combination of angles. The following function G evidences (normal) singularities or zeros for forbidden combinations of angles and central singularities for central allowed combinations of angles, $G[WA(n+1), WA(n)]=\tan[WA(n+1)-\pi/6]*\sin[WA(n)+2\pi/3]$ with $\partial=-\pi/6$, $b=0$, $Y(WA)=\sin[WA+2\pi/3]$.

In more detail, the following values of function G (called GA) are obtained and displayed in Table 2:

$GA_1=G(WA_2, WA_1)=\tan(WA_2-\pi/6)\sin(WA_1+2\pi/3)$, $GA_2=G(WA_3, WA_2)=\tan(WA_3-\pi/6)\sin(WA_2+2\pi/3)$, Chose m=2, and f=1, $F[WINKEL(n), WINKEL(n-1), \ldots; p1, p2, \ldots]=p_0+p1*\sin(WINKEL(n))+pp1*\cos(WINKEL(n))+p2*\sin(2*WINKEL(n))+pp2*\cos(2*WINKEL(n))$.

In more detail, the following values of harmonic functions are evaluated and displayed in Table 2 as sin A, cos A, sin 2A, cos 2A:

$\sin A_1=\sin(WA_1)$, $\sin A_2=\sin(WA_2)$, ..., $\cos A_1=\cos(WA_1)$, $\cos A_2=\cos(WA_2)$, ..., $\sin 2A_1=\sin(2*WA_1)$, $\sin 2A_2=\sin(2*WA_2)$, ..., $\cos 2A_1=\cos(2*WA_1)$, $\cos 2A_2=\cos(2*WA_2)$, ....

TABLE 2

| GA | sin A | cos A | sin 2A | cos 2A |
|---|---|---|---|---|
| −0.5432 | −0.5476 | 0.8368 | −0.9164 | 0.4003 |
| 0.1408 | 0.0253 | 0.9997 | 0.0506 | 0.9987 |
| 1.2441 | 0.6344 | 0.7730 | 0.9808 | 0.1952 |
| 1.3179 | 0.9695 | −0.2451 | −0.4753 | −0.8798 |
| 0.4354 | 0.5318 | −0.8469 | −0.9007 | 0.4344 |
| −0.2185 | −0.1125 | −0.9937 | 0.2235 | 0.9747 |
| −0.5722 | −0.7096 | −0.7046 | 1.0000 | −0.0070 |
| −0.7702 | −0.9946 | 0.1035 | −0.2059 | −0.9786 |
| −0.4117 | −0.3857 | 0.9226 | −0.7117 | 0.7025 |
| 0.3436 | 0.1298 | 0.9915 | 0.2575 | 0.9663 |
| 1.4639 | 0.8029 | 0.5962 | 0.9573 | −0.2892 |
| 1.1174 | 0.9025 | −0.4307 | −0.7774 | −0.6289 |
| 0.2655 | 0.4001 | −0.9165 | −0.7334 | 0.6798 |
| −0.3210 | −0.2595 | −0.9657 | 0.5013 | 0.8653 |
| −0.6257 | −0.8134 | −0.5817 | 0.9463 | −0.3233 |
| −0.7607 | −0.9324 | 0.3614 | −0.6739 | −0.7388 |

Table 2 is taken as input to standard software for multiple linear regression, where column GA represents the dependent variable and the other columns the independent variables.

The result is:

| Regression-statistics | |
|---|---|
| Coefficient of correlation | 0.9992 |
| Measure of determination | 0.9984 |
| Adjusted measure of determination | 0.9978 |
| Standard error | 0.0366 |
| Observations | 16 |

| ANOVA | degrees of freedom |
|---|---|
| Regression | 4 |
| Residue | 11 |
| total | 15 |

| | coefficients |
|---|---|
| intersection | 0.1931 |
| X Variable 1 | 1.1509 |
| X Variable 2 | 0.1533 |
| X Variable 3 | 0.1873 |
| X Variable 4 | −0.1967 |

$P_0=0.1931$ $p1=1.1509$, $pp1=0.1533$, $p2=0.1873$, $pp2=-0.1967$.

$\tan[WINKEL(n+1)-\pi/6]*\sin[WINKEL(n)+2\pi/3]=p_0+p1*\sin(WINKEL(n))+pp1*\cos(WINKEL(n))+p2*\sin(2*WINKEL(n))+pp2*\cos(2*WINKEL(n))$ represents the implicit form of the regularity. Die explicit form of the recurrence relation, $WINKEL(n+1)=\arctan 2\{\sin[WINKEL(n)+2\pi/3]p_0+p1*\sin(WINKEL(n))+pp1*\cos(WINKEL(n))+p2*\sin(2*WINKEL(n))+pp2*\cos(2*WINKEL(n))\}+\pi/6$, leads to the reconstructed angles W_r in column 4 of Table 1, when starting with $WINKEL(1)=WA_1$.

All angles are defined in the interval $-\pi<=W\_r_n<=\pi$, i.e., W_r is reduced to the basic interval $W\_r_n=\mod(WINKEL(n)+\pi, 2\pi)-\pi$.

For the reconstruction of the original quantity, QUANTITY-A (column 5 in Table 1) two more iterations have to be done. Solvability constraint (2) leads to the recursion formula, $R\_r_{n+1}=R\_r_n*\sin(W\_r_n+2pi/3)/\cos(W\_r_{n+1}-\pi/6)$, and elimination of $A_{n+2}$ from equations (1a) and (1b) leads to $A\_r_{n+1}=R\_r_n*\cos(W\_r_n-\pi/6)/\sqrt{6}-A\_r_n$.

As starting values, $R\_r_1\sqrt{(L_1^2(A_1, A_2, A_3)+L_2^2(A_1, A_2, A_3))}$ and $A\_r_1=A_1$ are used. The last two columns of Table 1 contain improved reconstructions of angle WA and QUANTITY-A, which have been obtained on the basis of 40 values of QUANTITY-A (instead of 17) and by using a Fourier sum of order 6. The example shows that qualitatively good reconstructions of the dynamics can be obtained even in the case of short time series.

Besides the definition of angles as given in the above example, which may be seen as a sharply localized version of the Hilbert phase, the above steps can also be executed for $L_1(A_n, A_{n+1}, A_{n+2})=A_n-2A_{n+1}+A_{n+2}$.

In this case both linear functions $L_1$ und $L_2$ represent a high pass filter. Therefore this "high pass phase" is particularly suited for instationary data.

EXAMPLE 2

The second example detects and determines the regularity of medical data. The two measured quantities are respiratory flow and heartbeat lengths RR. Using a high pass filter, the measured signals are freed from perturbative components resulting in QUANTITY-A and QUANTITY-B given in Table 3. QUANTITY-A results from raw data RR and QUANTITY-B from the (uncalibrated) respiratory airflow.

TABLE 3

| time | flow | QUANTITY -B | RR | QUANTITY -A | WB | WA |
|---|---|---|---|---|---|---|
| 11.147 | 2906.20 | 1.668 | 1.061 | 0.033 | 3.096 | 5.906 |
| 12.164 | 2944.19 | 38.799 | 1.017 | −0.013 | 1.528 | 2.591 |

TABLE 3-continued

| time | flow | QUANTITY-B | RR | QUANTITY-A | WB | WA |
|---|---|---|---|---|---|---|
| 13.204 | 2892.00 | −15.083 | 1.040 | 0.008 | 5.912 | 1.364 |
| 14.276 | 2879.24 | −29.338 | 1.072 | 0.038 | 4.238 | 0.327 |
| 15.324 | 2932.32 | 23.347 | 1.048 | 0.013 | 2.469 | 5.001 |
| 16.316 | 2932.03 | 22.368 | 0.992 | −0.044 | 0.764 | 3.260 |
| 17.347 | 2894.98 | −16.303 | 1.031 | −0.005 | 5.653 | 1.749 |
| 18.412 | 2887.01 | −24.875 | 1.065 | 0.029 | 4.132 | 0.490 |
| 19.463 | 2931.08 | 20.359 | 1.051 | 0.015 | 2.456 | 5.083 |
| 20.458 | 2939.35 | 29.296 | 0.995 | −0.040 | 0.963 | 3.338 |
| 21.484 | 2892.61 | −17.782 | 1.026 | −0.008 | 5.738 | 1.799 |
| 22.551 | 2886.12 | −23.717 | 1.067 | 0.034 | 4.069 | 0.450 |
| 23.599 | 2928.62 | 20.297 | 1.048 | 0.017 | 2.434 | 5.095 |
| 24.588 | 2921.85 | 13.560 | 0.989 | −0.041 | 0.589 | 2.932 |
| 25.626 | 2890.38 | −20.037 | 1.038 | 0.009 | 5.307 | 1.374 |
| 26.699 | 2884.54 | −28.664 | 1.073 | 0.044 | 4.102 | 6.010 |
| 27.716 | 2935.13 | 19.181 | 1.017 | −0.012 | 2.552 | 4.493 |
| 28.691 | 2937.16 | 17.782 | 0.975 | −0.056 | 0.748 | 3.536 |
| 29.700 | 2906.90 | −15.853 | 1.009 | −0.023 | 5.555 | 2.541 |
| 30.750 | 2918.10 | −5.934 | 1.050 | 0.016 | 3.500 | 5.893 |
| 31.780 | 2960.35 | 37.137 | 1.030 | −0.007 | 1.729 | 4.524 |

$W(A_1, A_2) = \arctan 2(A_1, A_2)$ is chosen as a homogenous function, with linear combinations $L_1 = A_1$ and $L_2 = A_2$ and analogously $W(B_1, B_2) = \arctan 2(B_1, B_2)$.

In more detail the following values of type angle are obtained:

$WA_1 = W(A_1, A_2) = \arctan 2(A_1, A_2)$, $WA_2 = W(A_2, A_3) = \arctan 2(A_2, A_3)$, ... and $WB_1 = W(B_1, B_2) = \arctan 2(B_1, B_2)$, $WB_2 = W(B_2, B_3) = \arctan 2(B_2, B_3)$, ...

The numerical values of all angles are given in Table 3 in columns WA and WB. Function G is chosen as $G[WINKEL_A(n+1), WINKEL_A(n)] = \tan(WINKEL_A(n+1)) * \sin(WINKEL_A(n))$ with ($\partial = 0$, b = 0).

In more detail the following values of function G (called GA) are determined:

$GA_1 = G(WA_2, WA_1) = \tan(WA_2)\sin(WA_1)$, $GA_2 = G(WA_3, WA_2) = \tan(WA_3)\sin(WA_2)$.

The numerical values are given in Table 4 in column GA. Chose $m_a = 1$, $m_b = 1$, $m_c = 1$ und $m_d = 0$ and f = 1 and $F[WINKEL_A(n), WINKEL_A(n−1), \ldots, WINKEL_B(n), WINKEL_B(n−1), \ldots; p1, p2, \ldots] = p_0 + pa * \sin[WINKEL_A(n) + \alpha_i] + pb * \sin[WINKEL_B(n) + \beta_j] + pc * \sin[WINKEL_A(n) − WINKEL_B(n) + \chi_k]$.

Following the addition theorem of the sin-function this Ansatz is equivalent to $F[WINKEL_A(n), \ldots, WINKEL_B(n), \ldots; p1, p2, \ldots] = p_0 + pa * \sin[WINKEL_A(n)] + ppa * \cos[f * WINKEL_A(n)] + pb * \sin[WINKEL_B(n)] + ppb * \cos[f * WINKEL_B(n)] + pc * \sin[WINKEL_A(n) − WINKEL_B(n)_k] + ppc * \cos[WINKEL_A(n) − WINKEL_B(n)_k]$ In more detail the following values of harmonic functions (called sin A, cos A, sin AB, cos AB) are evaluated:

$\sin A_1 = \sin(WA_1)$, $\sin A_2 = \sin(WA_2)$, ... and $\cos A_1 = \cos(WA_1)$, $\cos A_2 = \cos(WA_2)$, ... and $\sin B_1 = \sin(WB_1)$, $\sin B_2 = \sin(WB_2)$, ... and $\cos B_1 = \cos(WB_1)$, $\cos B_2 = \cos(WB_2)$, ... and $\sin AB_1 = \sin(WAB_1)$, $\sin AB_2 = \sin(WAB_2)$, ... and $\cos AB_1 = \cos(WAB_1)$, $\cos AB_2 = \cos(WAB_2)$, ....

The numeric values are given in columns sin A, cos A, sin B, cos B, sin AB, cos AB of Table 4.

TABLE 4

| GA | sinB | cosB | sinAB | cosAB | sinA | cosA |
|---|---|---|---|---|---|---|
| 0.226 | 0.046 | −0.999 | −0.326 | −0.945 | −0.368 | 0.930 |
| 2.497 | 0.999 | 0.043 | −0.874 | 0.486 | 0.524 | −0.852 |
| 0.332 | −0.362 | 0.932 | −0.987 | −0.163 | 0.979 | 0.205 |
| −1.082 | −0.889 | −0.457 | −0.695 | −0.719 | 0.322 | 0.947 |
| −0.114 | 0.623 | −0.782 | −0.573 | −0.820 | −0.959 | 0.285 |
| 0.656 | 0.692 | 0.722 | −0.602 | −0.799 | −0.118 | −0.993 |
| 0.525 | −0.589 | 0.808 | −0.691 | −0.723 | 0.984 | −0.177 |
| −1.214 | −0.836 | −0.548 | −0.480 | −0.877 | 0.471 | 0.882 |
| −0.186 | 0.633 | −0.774 | −0.492 | −0.870 | −0.932 | 0.362 |
| 0.843 | 0.821 | 0.571 | −0.694 | −0.720 | −0.196 | −0.981 |
| 0.471 | −0.519 | 0.855 | −0.715 | −0.699 | 0.974 | −0.226 |
| −1.083 | −0.800 | −0.600 | −0.459 | −0.888 | 0.435 | 0.900 |
| 0.198 | 0.650 | −0.760 | −0.462 | −0.887 | −0.928 | 0.373 |
| 1.047 | 0.556 | 0.832 | −0.717 | −0.698 | 0.208 | −0.978 |
| −0.275 | −0.828 | 0.560 | −0.711 | −0.703 | 0.981 | 0.195 |
| −1.211 | −0.820 | −0.573 | −0.944 | −0.330 | −0.270 | 0.963 |
| −0.407 | 0.556 | −0.831 | −0.932 | −0.362 | −0.976 | −0.218 |
| 0.264 | 0.680 | 0.733 | −0.346 | −0.938 | −0.384 | −0.923 |
| −0.232 | −0.665 | 0.746 | 0.127 | −0.992 | 0.565 | −0.825 |
| −1.992 | −0.351 | −0.937 | −0.680 | −0.733 | −0.380 | 0.925 |
| 0.513 | 0.987 | −0.158 | −0.340 | −0.940 | −0.982 | −0.187 |

Table 4 is taken as the input to standard software for multiple linear regression, where column GA represents the dependent variable and the other columns the independent variables.

The result is:

| Regression Statistics | |
|---|---|
| Coefficient of correlation | 0.94298 |
| Measure of determination | 0.88922 |
| Adjusted measure of determination | 0.84174 |
| Standard error | 0.38874 |
| Observations | 21 |

| ANOVA | degrees of freedom |
|---|---|
| Regression | 6 |
| Residue | 14 |
| total | 20 |

| | coefficients |
|---|---|
| intersection | 0.79554 |
| X Variable 1 | 1.65197 |
| X Variable 2 | 0.21054 |
| X Variable 3 | 0.71818 |
| X Variable 4 | 0.61474 |
| X Variable 5 | 1.07526 |
| X Variable 6 | 0.22753 |
| $p_0$ = 0.796 | |
| pa = 1.075, | ppa = 0.228 |
| pab = 0.718, | ppab = 0.615 |
| pb = 1.652, | ppb = 0.211. |

$\tan(WINKEL_A(n+1)) * \sin(WINKEL_A(n)) = p_0 + pa * \sin[WINKEL_A(n)] + ppa * \cos[f * WINKEL_A(n)] + pb * \sin[WINKEL_B(n)] + ppb * \cos[f * WINKEL_B(n)] + pab * \sin[WINKEL_A(n) − WINKEL_B(n)_k] + ppab * \cos[WINKEL_A(n) − WINKEL_B(n)_k]$ represents the implicit form of the regularity, which can also be brought into explicit form:

WINKEL$_A$(n+1)=(arctan 2(sin(WINKEL$_A$(n), p$_0$+pa*sin[WINKEL$_A$(n)]+ppa*cos[f*WINKEL$_A$(n)]+pb*sin[WINKEL$_B$(n)]+ppb*cos[f*WINKEL$_B$(n)]+pab*sin[WINKEL$_A$(n)−WINKEL$_B$(n)$_k$]+ppab*cos[WINKEL$_A$(n)−WINKEL$_B$(n)$_k$])

Figure 2:
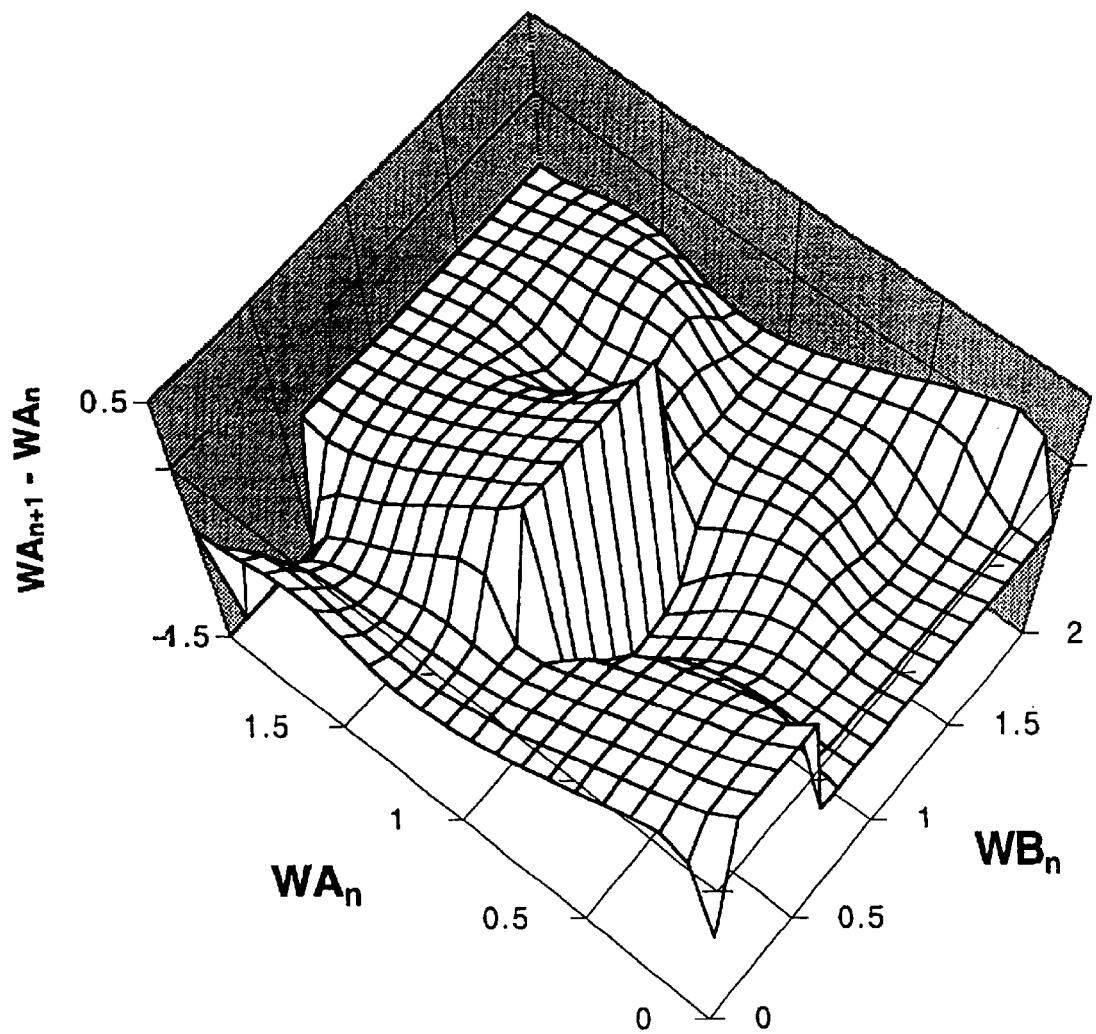
FIG. 2 is a three-dimensional plot showing the cardial angularity velocity profile $(WA_{n+1}-WA_n)$, i.e., the change of the cardial angle WA as a function of the momentary angle $WA_n$ and of the corresponding respiratory angle $WB_n$.
Figure 3:
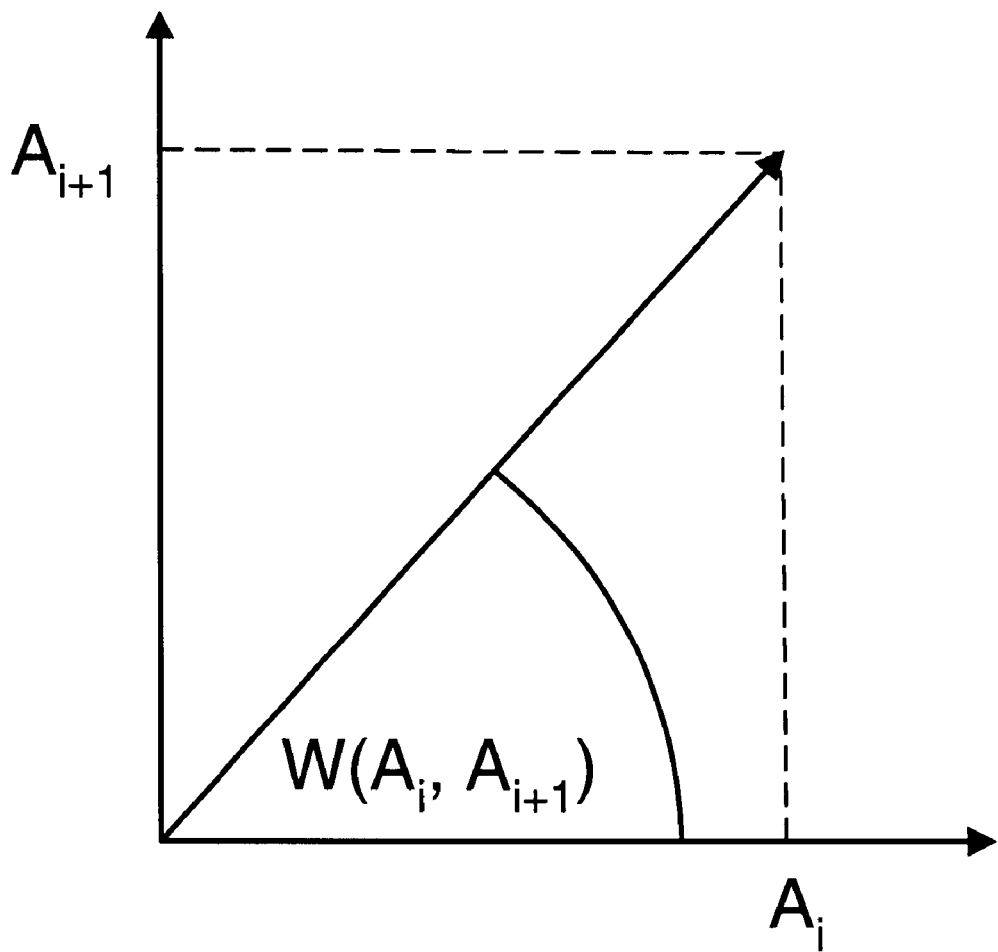
FIG. 3 is a graph showing the definition of angle $W(A_i, A_{i+1})$.

FIG. 2 The figure shows a typical result, which is, however, obtained from different data. The figure shows the cardiac angular velocity profile (WA$_{n+1}$−WA$_n$) which describes the angular change of the heartbeat length modulation as a function of the momentary value of the cardiac angle WA$_n$ and the respiratory angle WB$_n$.

This profile describes a hand-shaking type of synchronization. Nonnegative values of the cardiac angular velocity for a certain range of respiratory angles implies that the dynamics of the cardiac angle comes to a rest or even reverses until the respiratory angle WB$_n$ enters the complementary range. (Both angular velocities are negative on average and the angles are indicated in units of π.)

The square root of (pab$^2$+ppab$^2$) can be interpreted as a measure for the strength of the cross impact of QUANTITY-B on QUANTITY-A.

A further example may be seen in the time course of the fuel injection into a combustion engine and its resulting torque. In this case, the regularity can be determined by analogy. Deviations from the determined profile can be taken as evidence for abnormalities. Typical deviations may signal the kind of abnormality.

The above-described method and device are illustrative of the principles of the present invention. Numerous modifications and adaptations will be readily apparent to those skilled in this art without departing from the spirit and scope of the present invention.

What is claimed is:

1. A method to detect and determine a regularity of a cyclically fluctuating scientific or technical QUANTITY-A, comprising the steps of:

determining, using a detector, values Ai of QUANTITY-A;

automatically storing, in a computer memory of a computer connected to said detector, said values Ai;

choosing, using a processor of said computer, a homogenous function W(Ai, Ai+1, . . . ) which maps at least two determined values of QUANTITY-A to a value of type angle (WINKEL), said homogeneous function fulfilling the criteria:

W(apositiv*Ai, apositiv*Ai+1, . . . )=W(Ai, Ai+1, . . . ) for all apositiv, where apositiv can be any positive number, which evidences for a natural number k≧1 forbidden combinations of values of type angle (WINKEL) in which a combination of WINKEL(n) and WINKEL(n+1) is forbidden, if the back-transformation of W(Ai, Ai+1, . . . )=WINKEL(n) and W(Ai+k, Ai+k+1, . . . )=WINKEL(n+1) either is not possible or does exclusively allow solutions A, for which at least one complete definition set of (A→W) becomes zero or at least one value of A becomes singular, for which said back-transformation evidences a central allowed combination of values of type angle, where a central allowed combination of angles lies in the intersection of manifolds, which are formed by forbidden combinations of angles;

mapping, using said homogenous function W(Ai, Ai+1, . . . ), at least two determined values A1, A2, . . . to a value WINKEL1;

mapping, using said homogenous function W(Ai, A$_{i+1}$1, . . . ), at least two determined values A1+k, A2+k, . . . with said value k to a value WINKEL2;

mapping, using said homogenous function W(Ai, Ai+1, . . . ), at least two determined values A1+m, A2+m, . . . with m>k to a value WINKEL3;

producing an implicit rule of behavior as an equation according to G[WINKEL(n+1), WINKEL(n), . . . ]=F[WINKEL(n), . . . ; p1, p2, . . . ], wherein said bi- or multivariate function G[WINKEL(n+1), WINKEL(n), . . . ] evidences singularities for combinations of WINKEL(n+1) and WINKEL(n), which belong to a set of forbidden combinations of angles, or G[WINKEL(n+1), WINKEL(n), . . . ] can be represented as a bounded univariate function of such a singular multivariate function;

wherein said bi- or multivariate function G[WINKEL(n+1), WINKEL(n), . . . ] evidences a central singularity for a central allowed combination of WINKEL(n+1), WINKEL(n), . . . , wherein a central singularity of bi- or multivariate function G evidences a convex neighborhood of arbitrary size of combinations of angles, in which said bi- or multivariate function G assumes any value of a finite or infinite interval;

determining said parameters p1, p2, . . . of said function F[WINKEL(n), . . . ; p1, p2, . . . ] by adjusting the implicit rule of behavior to values WINKEL1, WINKEL2, WINKEL3, . . . , said adjustment being based on residuals of a form R(n)=G[WINKEL(n+1), WINKEL(n), . . . ]−F[WINKEL(n), . . . ; p1, p2, . . . ] with WINKEL(1)=WINKEL1, WINKEL(2)=WINKEL2, . . . , being achieved either by a type of interpolation or approximation or with the help of other regression methods to adjust the parameters, using said function G[WINKEL(n+1), WINKEL(n), . . . ]=F[WINKEL(n), . . . ; p1,p2, . . . ] to express said regularity; and outputting an expression of regularity for a use selected from the group consisting of controlling a process, problem/change detection and diagnosis.

2. A method according to claim 1, wherein more than three values Ai, Ai+1, Ai+2, . . . of QUANTITY-A are determined per average cycle.

3. A method according to claim 1, wherein equation G[WINKEL(n+1), WINKEL(n), . . . ]=F[WINKEL(n), . . . ; p1, . . . ] is solved for WINKEL(n+1)=H(WINKEL(n), . . . ; p1, . . . ) and said solved equation is used as said regularity.

4. A method according to claim 1, wherein said functions G[WINKEL(n+1), WINKEL(n), . . . ] and F[WINKEL(n), . . . ; p1, . . . ] evidence a period for every argument of type angle for WINKEL(n+1), WINKEL(n), . . . .

5. A method according to claim 1, further comprising the step of choosing function F[WINKEL(n), . . . ; p1, . . . ] to have no singularity.

6. A method according to claim 1, further comprising the step of choosing W(Ai, Ai+1, . . . )=arctan 2(L1, L2) as a homogenous function, where L1=(c1Ai+c2Ai+1+ . . . ) and L2=(d1Ai+d2Ai+1+ . . . ) are linear combinations and where a bivariate function arctan 2(L1, L2) extends the range of a univariate function arctan(L1/L2) to a full period 2π.

7. A method according to claim 1, further comprising the step of choosing said function G as G[WINKEL(n+1), WINKEL(n)]=[tan(WINKEL(n+1)+∂)+b]*y(WINKEL(n)).

8. A method according to claim 1, further comprising the step of choosing said function F as F[WINKEL(n), . . . ; p1, . . . ]=p$_0$+Σ{pi*sin(f*i*WINKEL(n))+ppi*cos (f*i*WINKEL(n))}, where i is used as summation index (i=1, ..., m) with natural number m and f=2π/(range of W).

9. A method according to claim 1, wherein F[WINKEL (n), ... ; p1, ... ]=Σ{pai*sin[f*i*WINKEL(n)+αi]}+ Σ{pbj*sin[f*j*WINKEL(n−1)+βj]}+Σ{pck*sin<f*k* [WINKEL(n)−WINKEL(n−1)+χk]>}+Σ{pdm*sin<f*m* [WINKEL(n)+WINKEL(n−1)+δm]>}+..., where i=0, ..., ma, j=0, ..., mb, k=0, ..., mc, m=0, ..., md and f>0, αi, βj, χk, δm represent real numbers.

10. A method according to claim 1, further comprising the steps for determining and detecting for a scientific or technical QUANTITY-B of:
   determining, using a detector, values Bi of QUANTITY-B;
   automatically storing, in said computer memory, said values Bi;
   choosing, using a processor of said computer, a homogenous function W(Bi, Bi+1, ...) which maps at least two determined values of QUANTITY-B to a value of type angle (WINKEL), said homogenous function fulfilling the criteria:
      W(apositiv*Bi, apositiv*Bi+1, ...)=W(Bi, Bi+1, ...) for all apositiv, where apositiv can be any positive number;
   mapping, using said homogenous function W(Bi, Bi+1, ...), at least two determined values B1, B2, ... to a value WINKELB1;
   mapping, using said homogenous function W(Bi, Bi+1, ...), at least two determined values B1+k, B2+k, ... to a value WINKELB2;
   producing an implicit rule of behavior as an equation according to G[WINKELA(n+1), WINKELA(n), ... ]=F[WINKELA(n), WINKELB(n), ... ; p1, ... ];
   where said bi- or multivariate function G[WINKELA(n+1), WINKELA(n), ... ] evidences singularities for combinations of WINKELA(n+1) and WINKELA(n), which belong to the set of forbidden combinations of angles, or G[WINKELA(n+1), WINKELA(n), ... ] can be represented as a bounded univariate function of such a singular multivariate function;
   wherein said bi- or multivariate function G[WINKELA(n+1), WINKELA(n), ... ] evidences a central singularity for a central allowed combination of WINKELA(n+1) and WINKELA(n), ... ; and
   adjusting said implicit rule of behavior to determine said parameters p1, p2, ... of function F[WINKELA(n), WINKELB(n), ... ; p1, ... ] to the values WINKELA1, WINKELA2, ..., WINKELB1, WINKELB2, ....

11. A method according to claim 10, wherein G[WINKELA(n+1), WINKELA(n), ... ]=$p_0$+Σ{pai*sin [f*i*WINKELA(n)+αi]}+Σ{pbj*sin[f*j*WINKELB(n)+ βj]}+Σ{pck*sin<f*k*[WINKELA(n)−WINKELB(n)+χk] >}+Σ{pdm*sin<f*m*[WINKELA(n)+WINKELB(n)+δm] >}+..., with i=0, ..., ma, j=0, ..., mb, k=0, ..., mc, m=0, ..., md and f>0 is used to express the regularity of QUANTITY-A including a cross impact by QUANTITY-B.

12. A method according to claim 1 further comprising the step of graphically representing at least one of said regularity and a correlation via a display or a printer.

13. A device for detecting and determining a regularity of a cyclically fluctuating scientific or technical QUANTITY-A, comprising:
   a detector to determine values Ai of QUANTITY-A;
   a computer, which is connected to said detector in such a way that the determined values are automatically stored into a memory of said computer;
   said computer having installed software to execute the following steps:
      forming a homogenous function W(Ai, Ai+1, ...), which maps at least two determined values of QUANTITY-A to a value of type angle (WINKEL), the homogeneity of which fulfills W(apositiv*Ai, apositiv*Ai+1, ...)=W(Ai, Ai+1, ...) for all apositiv, where apositiv can be any positive number, which evidences for a natural number k≧1 forbidden combinations of values of type angle (WINKEL), where a combination of WINKEL(n) and WINKEL (n+1) is forbidden, if the back-transformation of W(Ai, Ai+1, ...) WINKEL(n) and W(Ai+k, Ai+k+ 1, ...)=WINKEL(n+1) either is not possible or does exclusively allow solutions A, for which at least one complete definition set of (A→W) becomes zero or at least one value of A becomes singular, and for which the said back-transformation evidences a central allowed combination of values of type angle, where a central allowed combination of angles lies in the intersection of manifolds, which are formed by forbidden combinations of angles;
   mapping, using homogenous function W(Ai, Ai+1, ...) at least two determined values A1, A2, ... to a value WINKEL1;
   mapping, using said homogenous function W(Ai, Ai+1, ...), at least two determined values A1+k, A2+k, ... with said k are mapped to a value WINKEL2;
   mapping, using homogenous function W(Ai, Ai+1, ...), at least two determined values A1+m, A2+m, ... with m>k are mapped to a value WINKEL3;
   producing an implicit rule of behavior as an equation according to G[WINKEL(n+1), WINKEL(n), ... ]=F [WINKEL(n), ... ; p1, p2, ... ];
   wherein bi- or multivariate function G[WINKEL(n+1), WINKEL(n), ... ] evidences singularities for combinations of WINKEL(n+1) and WINKEL(n), which belong to a set of forbidden combinations of angles, or G[WINKEL(n+1), WINKEL(n), ... ] can be represented as a bounded univariate function of such a singular multivariate function;
   wherein said bi- or multivariate function G[WINKEL(n+1), WINKEL(n), ... ] evidences a central singularity for a central allowed combination of WINKEL(n+1), WINKEL(n), ..., where a central singularity of bi- or multivariate function G evidences a small convex neighborhood as small as desired, where function G assumes any value of a finite or infinite interval;
   determining said parameters p1, p2, ... of said function F[WINKEL(n), ... ; p1, p2, ... ] by adjusting the implicit rule of behavior to the values WINKEL1, WINKEL2, WINKEL3, ..., said adjustment being based on residuals of a form R(n)=G[WINKEL(n+1), WINKEL(n), ... ]−F[WINKEL(n), ... ; p1, p2, ... ] with WINKEL(1)=WINKEL1, WINKEL(2)= WINKEL2, ... being achieved either by a type of interpolation or approximation or with the help of other regression methods to adjust the param
   eters, G[WINKEL(n+1), WINKEL(n), ... ]=F [WINKEL(n), ... ; p1, p2, ... ] to express said regularity; and
   outputting an expression of regularity for a use selected from the group consisting of controlling a process, problem/change detection and diagnosis.

* * * * *